US012754956B2

(12) United States Patent
Massri et al.

(10) Patent No.: US 12,754,956 B2
(45) Date of Patent: Oct. 6, 2026

(54) SYSTEM AND METHOD FOR STORING A GRAPH-ORIENTED TIME DATABASE

(71) Applicant: Orange, Issy-les-Moulineaux (FR)

(72) Inventors: Maria Massri, Chatillon Cedex (FR); Philippe Raipin Parvedy, Chatillon Cedex (FR); Pierre Obame Meye, Chatillon Cedex (FR)

(73) Assignee: Orange, Issy-les-Moulineaux (FR)

( * ) Notice: Subject to any disclaimer, the term of this patent is extended or adjusted under 35 U.S.C. 154(b) by 0 days.

(21) Appl. No.: 18/714,501

(22) PCT Filed: Nov. 22, 2022

(86) PCT No.: PCT/EP2022/082866
§ 371 (c)(1),
(2) Date: May 29, 2024

(87) PCT Pub. No.: WO2023/099291
PCT Pub. Date: Jun. 8, 2023

(65) Prior Publication Data

US 2025/0021604 A1 Jan. 16, 2025

(30) Foreign Application Priority Data

Nov. 30, 2021 (FR) ....................................... 2112754

(51) Int. Cl.
*G06F 16/901* (2019.01)

(52) U.S. Cl.
CPC ................................ *G06F 16/9024* (2019.01)

(58) Field of Classification Search
CPC ............. G06F 16/9024; G06F 16/2477; G06F 16/228; G06F 16/2282
See application file for complete search history.

(56) References Cited

U.S. PATENT DOCUMENTS

| | | | | |
|---|---|---|---|---|
| 10,791,063 B1 * | 9/2020 | Florissi | ................. | H04L 47/783 |
| 2006/0010227 A1 * | 1/2006 | Atluri | ................. | H04L 67/1095 709/217 |
| 2010/0169591 A1 * | 7/2010 | Atluri | ................. | G06F 11/1448 711/E12.001 |
| 2013/0226959 A1 * | 8/2013 | Dittrich | ............... | G06F 16/2453 707/769 |

(Continued)

OTHER PUBLICATIONS

International Search Report for International Application No. PCT/EP2022/082866 dated Feb. 6, 2023.

(Continued)

*Primary Examiner* — Angelica Ruiz
(74) *Attorney, Agent, or Firm* — Knobbe, Martens, Olson & Bear, LLP

(57) ABSTRACT

A system for storing a graph-oriented time database, including a set of containers associated with adjacent time windows, a container containing a sequence of successive modifications of the graph over a time window with which it is associated. At least some of the containers, called reference containers, also contain a snapshot of the graph within the tine widow associated with the reference container, called reference snapshot. At least some other containers, called delta containers, contain a difference image between two snapshots of the graph, respectively associated with the start and with the end of the time window associated with the delta container.

12 Claims, 4 Drawing Sheets

(56) References Cited

U.S. PATENT DOCUMENTS

| | | | | |
|---|---|---|---|---|
| 2013/0339643 | A1* | 12/2013 | Tekade | G06F 16/128 711/162 |
| 2014/0143754 | A1* | 5/2014 | Henderson | G06F 9/45504 717/108 |
| 2014/0344216 | A1* | 11/2014 | Abercrombie | G06F 16/137 707/609 |
| 2016/0019228 | A1* | 1/2016 | Hong | G06F 16/2246 707/624 |
| 2016/0077926 | A1* | 3/2016 | Mutalik | G06F 16/1844 711/162 |
| 2016/0125095 | A1* | 5/2016 | Xu | G06F 16/9024 707/740 |
| 2021/0334312 | A1 | 10/2021 | Neo et al. | |

OTHER PUBLICATIONS

French Search Report and Written Opinion for French Application No. FR2112754, dated Jun. 28, 2022.

George et al., "Spatio-Temporal Sensor Graphs (STSG): A Data Model for the Discovery of Spatio-Temporal Patterns", Intelligent Data Analysis, vol. 13, No. 3, 2009, pp. 457-475.

Massri, "Towards designing a temporal graph management system", Oct. 25, 2021, pp. 91-92, Proceedings of the Conference Bda'2021-37E Conference Sur La Gestion De Données, Retrieved from the Internet: https://hal.inria.fr/hal-03500588/document.

Udayan Khurana et al., "Efficient snapshot retrieval over historical graph data", Data Engineering (ICDE), 2013 IEEE 29$^{th}$ International Conference on, IEEE, ICDE Conference, Apr. 8, 2013, pp. 997-1008.

Udayan Khurana et al., "Storing and Analyzing Historical Graph Data at Scale", Cornell University, arxiv.org, Sep. 2015, https://arxiv.org/abs/1509.08960.

Koloniari et al., "On Graph Deltas for Historical Queries", WOSS, Istanbul, Turkey, Proceedings of 1st Workshop on Online Social Systems (WOSS) Feb. 2013, https://arxiv.org/abs/1302.5549.

Haeusler et al., "ChronoGraph Versioning Support for OLTP TinkerPop Graphs", In Proceedings of the 6$^{th}$ International Conference on Data Science, Technology and Applications (Data 2017), pp. 87-97.

Han et al., "Auxo: A Temporal Graph Management System", Big Data Mining and Analytics, vol. 2, No. 1, Mar. 2019, pp. 58-71.

Xiangyu et al., "An Efficient Snapshot Strategy for Dynamic Graph Storage Systems to Support Historical Queries", IEEE Access, vol. 8, May 2020, pp. 90838-90846.

Miao et al., "ImmortalGraph: A System for Storage and Analysis of Temporal Graphs", ACM Transactions on Storage, vol. 11, No. 3, Article 14, Jul. 2015.

Salzberg et al., "Comparison of Access Methods for Time-Evolving Data", ACM Computing Surveys, vol. 3, No. 2, Jun. 1999, pp. 158-221.

Steer et al., "Raphtory: Streaming analysis of distributed temporal graphs", Future Generation Computer Systems 102 (2020) pp. 453-464.

Written Opinion of the International Searching Authority for International Application No. PCT/EP2022/082866, dated Feb. 6, 2023 (corresponding to French Search Report and Written Opinion for French Application No. FR2112754 previously submitted).

* cited by examiner

SYSTEM AND METHOD FOR STORING A GRAPH-ORIENTED TIME DATABASE

CROSS-REFERENCE TO RELATED APPLICATIONS

This application is filed under 35 U.S.C. § 371 as the U.S. National Phase of Application No. PCT/EP2022/082866 entitled "SYSTEM AND METHOD FOR STORING A GRAPH-ORIENTED TIME DATABASE" and filed Nov. 22, 2022, and which claims priority to FR 2112754 filed Nov. 30, 2021, each of which is incorporated by reference in its entirety.

BACKGROUND

Field

The field of the development is that of graph-oriented databases. More specifically, the development relates to the optimized storage of such databases, for the purposes of reducing storage space and optimizing the latency required to query them.

Description of the Related Technology

A graph-oriented database is an object-oriented database using graph theory, therefore with nodes and arcs, making it possible to represent and store data.

Graph-oriented databases are widely used for modeling, storing and querying relationship-centered data. Indeed, they are particularly suitable in the case of processing relationships between data (for example knowledge among people, description of all of the parts of an industrial machine and how they are linked together).

These databases manage data as a collection of vertices and edges, in such a way that each edge links a pair of vertices. However, the vertices and the edges have one or more labels (types) and may have a list of key/value pairs referred to as properties.

Graph-oriented databases are currently used in social media modeling. They are similarly used in mass data storage or Big data.

However, conventional graph databases are not time-based, in that they only include the latest update of the graph. This is, indeed, a critical limitation for graphs integrating dynamic behavior. Let us take the example of an IoT ("Internet of Things") device network. The dynamic behavior of such a network stems from the fact IoT devices establish temporary connections with their environment. Such a use scenario may naturally be modeled in the form of a time graph where each edge is associated with a validity time interval, i.e. with a time interval during which the edge existed. Thus, the underlying graph management system must be capable of keeping these connections as well the time-based metadata which make it possible to reconstruct the graph status at all times.

In this context, a time graph management system should be designed to store and query such graphs. That is to say that the design of the storage model. the query language, the evaluation of queries, etc. requires optimized support of the time version in order to benefit from the time characteristic without degrading the system performances.

The challenge of data versioning is one of the classic problems of data management, but remains poorly studied in the context of graph databases.

The prior art study on time graph management systems shows the importance of storage technique optimization. In this context, two prior art techniques are proposed, namely the Log and Copy approaches.

The Log approach followed by George, B., Kang, J. M., & Shekhar, S. (2009) in "Spatio-temporal sensor graphs (stsg): A data model for the discovery of spatio-temporal patterns" (Intelligent Data Analysis, 13 (3), 457-475), and by Nowakowski, E., & Breu, R. (2018, June) in "ChronoGraph: A Versioned TinkerPop Graph Database" (Data Management Technologies and Applications: 6th International Conference, DATA 2017, Madrid, Spain, Jul. 24-26, 2017, Revised Selected Papers (Vol. 814, p. 237). Springer), consists of storing graph updates in the form of a series of timestamped logs such that any graph status may be retrieved by locating all the logs with relative timestamping prior to that requested. An update of the graph stored according to this approach is for example of the type "addition of the edge $e_i$ at the time $t^i$". This approach is particularly illustrated by FIG. 1. A limitation of this approach is that the evaluation of a query at the time t necessitates loading all the timestamped graph updates at a previous time t, which consumes computing time.

The Copy approach consists of representing and storing snapshots of the graph. This solution makes it possible exchange space for quicker recovery of the graph status and also has the limitation of losing data when the rates of change are more rapid than the snapshot frequency.

As discussed by Salzberg, B., & Tsotras, V. J. (1999) in "Comparison of access methods for time-evolving data" (ACM Computing Surveys (CSUR), 31 (2), 158-221), the Log and Copy methods represent two impractical extremes for storing time graphs. In other words, the Log and Copy methods favor the optimization of the use of space at the cost of query computing time or vice-versa.

To mitigate this apparent compromise, the Copy+Log method is described by Youshan Miao, Wentao Han, Kaiwei Li, Ming Wu, Fan Yang, Lidong Zhou, Vijayan Prabhakaran, Enhong Chen, and Wenguang Chen (2015) in "ImmortalGraph: A System for Storage and Analysis of Temporal Graphs" (ACM Trans. Storage 11, 3, Article 14 (July 2015), 34 pages) and by Han, W., Li, K., Chen, S., & Chen, W. (2018) in "Auxo: a temporal graph management system" (Big Data Mining and Analytics, 2 (1), 58-71). This approach is in particular illustrated by FIG. 2.

It consists of combining the above-mentioned method. The main idea is that of representing and perpetuating the graph statuses which are valid at certain times, while retaining the graph updates in disjoint time windows. To clarify, the time windows are physical containers of the graph updates taking place between two snapshots of the graph. Indeed, this offers the advantage of retrieving as much as possible all the updates of the graph from a single time window in order to respond to a query, the time of which is located within the bounds of this window.

However, one drawback of this approach is that the storage of graph snapshots is storage space-intensive. Indeed, snapshots use up space because they represent the status of each vertex or edge existing at a single time. However, in numerous use scenarios, some parts of the graph are static, in particular in growth graphs where additions are more likely than deletions. In this case, the vertices and the edges tend to exist for longer periods and are therefore copied into several snapshots.

Therefore, there is a need for an optimized graph-oriented time database storage technique which does not have these drawbacks of the prior art. In particular, there is a need for such a technique which makes it possible to overcome the limitation of the substantial storage overload induced by the storage of complete graph snapshots.

SUMMARY

The development addresses this need by providing a system for storing a graph-oriented time database, comprising a set of containers associated with adjacent time windows, a container containing a sequence of successive modifications of the graph over a time window with which it is associated. According to the development, at least some of the containers, called reference containers, also contain a snapshot of the graph within the time window associated with the reference container, called reference snapshot, and at least some other containers, called delta containers, contain a difference image between two snapshots of the graph, respectively associated with the start and with the end of the time window associated with the delta container.

Thus, the development is based on a completely novel and inventive graph-oriented time database storage approach. Indeed, the development provides a storage approach which could be called Delta-Copy+Log, which enhances the prior art Copy+Log technique and stores graph updates in disjoint time windows. The storage technique according to the development differs advantageously from the prior Copy+Log technique, in that it stores difference images, or deltas, representing the difference between the snapshots of the graph, instead of the snapshots themselves.

A difference image, or delta, between two snapshots S and S', contains the minimum number of graph updates making it possible to transform S into S'. In other words, a delta removes the redundant entities between two successive snapshots, which may be of great interest if it is assumed that the graph topology tends to evolve progressively.

Such a storage system contains nonetheless, besides these deltas, a certain number of snapshots which can serve as starting points for the evaluation of queries. Thus, after a certain number of delta containers, the storage system stores a complete snapshot of the graph memory.

A major advantage of this innovative Delta-Copy+Log approach lies in the reduction of the storage space used, compared to the prior art Copy+Log technique.

According to a first feature of the development, said difference image is stored in the form of a minimal number of modifications of the graph between two snapshots. According to another feature, the time windows may be of distinct durations but contain the same number N of successive updates of the graph.

The storage space required for the system is thus advantageously controlled. For example, the time windows may be sized to contain $10^6$ successive graph updates. Graph update denotes here, and throughout the document, an elementary modification of the graph, such as an edge addition or deletion between two nodes, or a node addition or deletion.

According to another feature, such a storage system comprises a fixed number M of time windows between two successive reference snapshots. This number M constitutes a flexible system parameter, making it possible to create the optimal compromise between the storage space required and the computing time necessary for processing database queries.

According to an advantageous feature, between two successive reference snapshots, the difference images of the first M/2 time windows contain modifications of the graph to be made to a snapshot of the graph associated with the start of the time window to transform it into a snapshot of the graph associated with the end of the time window, and the difference images of the last M/2 time windows contain modifications of the graph to be made to a snapshot of the graph associated with the end of the time window to transform it into a snapshot of the graph associated with the start of the time window.

Thus, such a system is based on an innovative forward and backward storage and querying approach in respect of time events. In other words, half of the deltas and the time windows between two snapshots are stored, and therefore queried, prospectively, whereas the other half is managed retrospectively.

Such a choice advantageously enables the acceleration of the execution time of queries. For example, the result of a query is computed forward or backward according to whether the requested time is closer to that of a previous or subsequent snapshot, respectively.

Thus, the difference images of the first half of the delta containers within a time window represent the difference between a snapshot and its predecessor while the difference images of the second half of the delta contains within the same time window represent the difference between a snapshot and its successor.

The execution time of the queries of such a storage system is thus advantageously reduced by approximately 50% with respect to a Delta-Copy+Log method only using "forward" windows.

According to another aspect, a Bloom filter type probabilistic structure is associated with at least some of said delta containers. Such a probabilistic structure makes it possible to verify the existence of updates. Thus, before reading a delta container to extract data from it, the associated Bloom filter is verified, to confirm for example that it contains updates linked with a node of interest. If the Bloom filter indicates with a certain probability the presence of an update impacting this node of interest (for example, addition or deletion of an edge linking it to a neighboring node), the delta container is consulted to extract the data of interest from it. On the other hand, if the Bloom filter indicates with certainty the absence of such an update, this delta container is not read, and superfluous computing time is saved. This has the advantage of attenuating the latency overload caused by storing the deltas instead of snapshots.

The development also relates to a method for storing a graph-oriented time database, in the form of a set of containers associated with adjacent time windows, a container containing a sequence of successive modifications of the graph over a time window with which it is associated. Such a storage method implements storage, in at least some of the containers, called reference containers, of a snapshot of the graph within the time window associated with the reference container, called reference snapshot, and storage, in at least some other containers, called delta containers, of a difference image between two snapshots of the graph, respectively associated with the start and with the end of the time window associated with the delta container.

According to an embodiment, such a storage method comprises storage steps in forward mode comprising:

(i) storing a reference snapshot of the graph;

(ii) storing updates of the graph within a current time window up to a maximum number N of updates;

(iii) closing the current time window and creating a difference image between two snapshots of the graph associated respectively with the start and with the end of the closed time window;

(iv) opening a new current time window and repeating steps (ii) and (iii), up to the storage of M/2 time windows, where M denotes a maximum number of time windows between two successive reference snapshots.

Such a storage method also comprises storage steps in backward mode comprising:

(i) storing updates of the graph within a first time window up to a maximum number N of updates;

(ii) closing the first time window and opening a second time window;

(iii) storing updates of the graph within the second time window up to a maximum number N of updates;

(iv) creating a difference image between two snapshots of the graph associated respectively with the start and with the end of the closed first time window;

(v) repeating steps (ii) to (iv), up to the storage of M/2 time windows, where M denotes a maximum number of time windows between two successive reference snapshots;

(vi) storing a reference snapshot of the graph.

The development also relates to a computer program product comprising program code instructions for the implementation of a method as described above, when it is executed by a processor.

The development also relates to a computer-readable recording medium on which a computer program comprising program code instructions for the execution of the steps of the storage method according to the development as described above is saved.

Such a recording medium may be any entity or device capable of storing the program. For example, the medium may include a storage means, such as a ROM, for example a CD ROM or a microelectronic circuit ROM, or a magnetic recording means, for example a USB key or a hard drive.

Moreover, such a recording medium may be a transmissible medium such as an electrical or optical signal, which may be routed via an electrical or optical cable, via radio or via other means, in such a way that the computer program contained therein is executable remotely. The program according to the development may be in particular downloaded onto a network for example the Internet.

Alternatively, the recording medium may be an integrated circuit wherein the program is incorporated, the circuit being adapted to execute or to be used in the execution of the display control method cited above.

The storage method, and the corresponding recording medium and computer program cited above have at least the same advantages as those provided by the storage system according to the present development.

BRIEF DESCRIPTION OF THE DRAWINGS

Further aims, features and advantages of the development will become more apparent on reading the following description, given merely by way of illustrative, and non-restrictive, example, with reference to the figures, wherein.

DETAILED DESCRIPTION OF CERTAIN ILLUSTRATIVE EMBODIMENTS

The general principle of the development is based on a novel form of graph-oriented time database storage, which enhances the prior so-called Copy+Log technique, by substantially reducing the storage space required. Indeed, it is proposed that some time windows are associated with reference containers containing, as in the Copy+Log method, a snapshot of the graph representative of the database; on the other hand, between two successive reference containers, it is proposed to provide a certain number of so-called delta containers, which only contain difference images between two successive snapshots S and S', i.e. the minimum number of updates of the graph making it possible to switch from S to S'.

Figure 1:
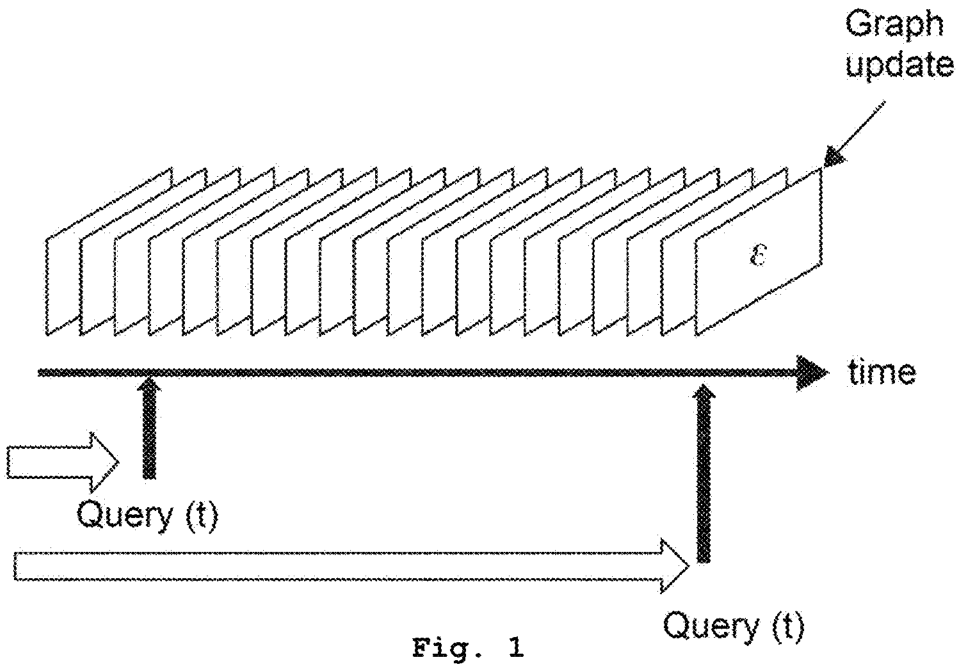
FIG. 1 shows in schematic form the prior art technique called Log.
Figure 2:
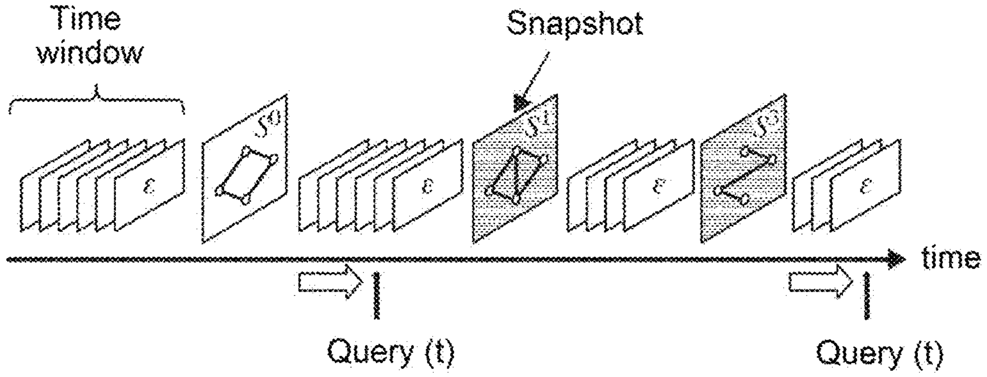
FIG. 2 illustrates in schematic form the prior art technique called Copy+Log.
Figure 3:
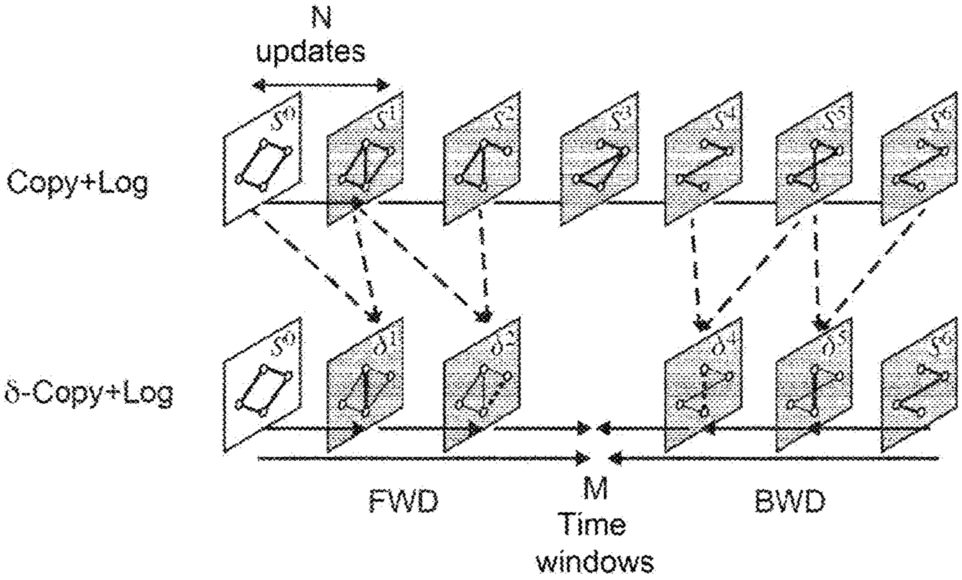
FIG. 3 shows a comparative block diagram of the prior Copy+Log technique, and the Delta-Copy+Log storage technique according to an embodiment of the development.

This general principle is illustrated by the block diagram of FIG. 3, the top part of which corresponds to the prior Copy+Log technique, and the bottom part of which corresponds to the claimed storage technique, by way of comparison.

As can be observed, the horizontal axis corresponds to the time axis, whereon M successive and disjoint time windows follow each other. Each time window is associated with a physical container of the updates of the graph which took place between two snapshots thereof.

According to the Copy+Log method, the storage system stores a set of successive snapshots of the graph referenced $S^0$ to $S^6$ in memory, as well as the set of N successive updates of the graph making it possible to switch from each snapshot $S^i$ to the next snapshot $S^{i+1}$. Thus, the storage system is organized into a succession of successive physical containers, each associated with adjacent time windows, and each containing a snapshot of the graph at the start of the time window with which it is associated, and the set of updates of the graph making it possible to switch from this snapshot to the snapshot of the next container, along the time axis.

According to an embodiment of the development, on the other hand, for the purposes of reducing storage space, it is refrained from storing a snapshot of the graph in each physical container corresponding to each of the successive time windows. On the other hand, some of these containers, called delta containers, do not contain a snapshot of the graph S', but merely a difference image $\delta^i$, corresponding to the differences between two snapshots of the graph at the start and at the end of the time window associated with the delta container in question. Thus, with reference to FIG. 3, the difference image $\delta^1$ corresponds to the minimum number of updates of the graph making it possible to switch from the snapshot $S^0$ to the snapshot $S^1$, namely in this instance the addition of an edge (operation illustrated with solid line) between two nodes of the graph; the difference image $\delta^2$ corresponds to the minimum number of updates of the graph making it possible to switch from the snapshot $S^1$ to the snapshot $S^2$, namely in this instance the deletion of an edge (operation illustrated with dotted lines) between two nodes of the graph. On the other hand, the snapshots $S^1$ and $S^2$ do not need to be stored in memory by the storage system.

Furthermore, as observed in FIG. 3, some of these difference images, or deltas, are constructed according to a forward FWD approach: thus, the delta container contains the set of the updates of the graph over a time window, and a delta image, which corresponds to the difference image between the snapshot of the graph at the end of the time window in question, and the snapshot of the graph at the start of this time window. The time axis is crossed from left to right, from the oldest times to the most recent times.

Conversely, some of these difference images, or deltas, are constructed according to a backward BWD approach; the time axis is then crossed from right to left, i.e. from the most recent times to the oldest times. The delta container then contains the set of updates of the graph over a time window, and a delta image, which corresponds to the difference image between the snapshot of the graph at the end of the time window in question, crossed in the opposite chronological direction, and the snapshot of the graph at the start of thins time window.

For example, with reference to FIG. 3, the difference image $S^5$ corresponds to the minimum number of updates of the graph making it possible to switch from the snapshot $S^6$ to its direct ancestor which is the snapshot $S^5$, namely in this instance the addition of an edge (operation illustrated with solid line) between nodes of the graph; the difference image $\delta^4$ corresponds to the minimum number of updates of the graph making it possible to switch from the snapshot $S^5$ to its direct ancestor $S^4$, namely in this instance the deletion of an edge (operation illustrated with dotted lines) between two nodes of the graph. The snapshots $S^4$ and $S^5$ do not need to be stored in memory by the storage system.

The reconstruction of the deltas in forward mode is established when a time window in front is closed (i.e. the number of updates in the window is equal to the limit size N). These updates are loaded and read in increasing chronological order. Thus, an update which is not followed by another inverse update is added to the delta image under construction. It is understood for example that the inverse of an update corresponding to the addition of an edge is an update corresponding to the deletion of the same edge, and vice versa.

The reconstruction of the deltas in backward mode is established with a similar strategy but delayed until the time of closure of the next time window. Furthermore, the updates are loaded in decreasing chronological order then inverted in such a way that an addition in forward mode is considered as a deletion in backward mode, and vice versa. Thus, in the direct chronological order, the status of the graph illustrated by the snapshot $S^4$ is modified by adding an edge to obtain the immediately next snapshot $S^5$. However, the difference image $\delta^4$, which corresponds to the updates of the graph in reverse chronological order, to switch from the snapshot $S^5$ to its direct ancestor $S^4$, contains, conversely, an indication of deletion of the same edge.

In the example of FIG. 3, M=6 time windows are thus stored in the form of physical containers between the two successive snapshots $S^0$ and $S^6$ stored in memory by the storage system. The first M/2 delta containers are stored and queried according to a forward mode; the last M/2 delta containers are stored and queried according to a backward mode. It will be noted however that it is not necessary to store the difference image $\delta^3$. Indeed, according to the claimed technique, the deltas which are centered between two snapshots stored in memory by the storage system are not relevant for the reconstruction of the result of a database query. Thus, $\delta_1$ and $\delta^2$ are stored in forward mode, and $\delta^4$ and $\delta^5$ are stored in backward mode.

This novel storage method, that may be called Delta-Copy+Log, finds its applicability in time graph management systems. Indeed, it may be implemented by any time graph system, as a backend storage technique, which optimizes both the space and execution time of queries.

This novel storage technique finds for example an advantageous application in the field of logistic chains, which may be modeled as time graphs where the vertices of this graph represent products, factories, shipping vehicles, retailers, etc. Sensors may be deployed to track the different positions of the products. For example, a temporary edge may be created between the product and its location, which is only valid for the time interval during which the object was found at this location. It is thus possible to track the movement of a product along the logistic chain, and identify for example the location where it was located when a fault affecting it was detected.

This novel Delta-Copy+Log storage technique may also find an interesting application in the field of the Internet of Things (IoT). Indeed, such IoT networks may be naturally modeled in the form of a time graph. The connected objects establish temporary connections with the surrounding devices, such as a smart car connected to other cars, traffic lights, street cameras, radars, etc. The management of this type of graph makes it possible to better analyze the cause of accidents by reconstructing the status of the graph just before the accident.

In a graph-oriented time database context comprising for example a set of connected objects (cameras, printers, door locks, etc.) and non-connected objects (buildings, rooms, streets, etc.), such as the Thing'in platform under development by the Applicant, such an enhanced storage technique makes it possible to better analyze and plan the behavior of the underlying systems.

Finally, such an optimized Delta-Copy+Log storage technique may also be adopted in video compression strategies by analogically replacing the deltas of the graph by video frames. It may furthermore be used in time series databases by a simple modification of the diagram of the time windows, snapshots and deltas.

An example of a use scenario in a smart factory context will now be described, with reference to FIGS. 4 to 7.

In this simplified scenario, a time graph is considered modeling the dynamic connections between the components and the employees of a smart factory (connections between the machines, the sensors, the products, the power sources, the employees, etc.). Such a time graph has the objective of keeping a record of the different positions of a product during the manufacturing process. This may be extended to detect the causes of manufacturing delays or product losses.

To address the question of the identification of such a cause of manufacturing delay or product loss, it is necessary to store, and therefore query, the temporary edges of the smart factory modeling graph, with their relative timestamps. However, in view of the increasing size of such a time graph, one of the main requirements is that of being able to store these updates using an efficient technique in terms of space, without degrading the response time to the query.

Figure 4:
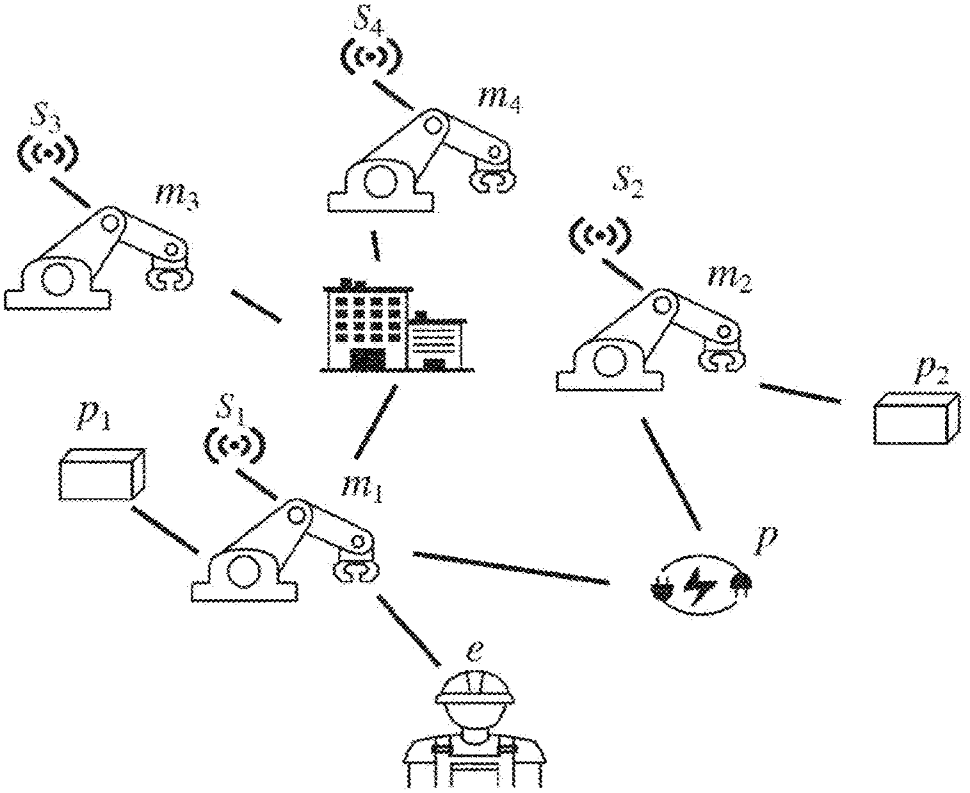
FIG. 4 shows an example of a graph-oriented time database associated with a smart factory.

The example of a graph illustrated in FIG. 4 is considered, which describes the set of components of a smart factory, and their interactions. A set of nodes is observed on this graph, comprising machines referenced $m_1$ to $m_4$, an employee referenced e, manufactured products referenced $p_1$ and $p_2$, a set of sensors referenced $s_1$ to $s_4$, and a power source referenced p. An edge of the graph illustrates the connection existing at a given time between two nodes of the graph: for example, the edge linking the power source p to the machine $m_2$ illustrates the fact that the machine $m_2$ is supplied with power by the source p, at a given time; the edge linking the sensor $s_4$ to the machine $m_4$ illustrates a connection between the machine $m_4$ and the sensor $s_4$, at a given time.

The next series of updates $\varepsilon^1$ to $\varepsilon^{12}$ of the graph of FIG. 4 is considered:

TABLE 1

| Graph update | Description |
|---|---|
| $\varepsilon^1$ | Addition of "Connected to" edge: machine $m_1$ and sensor $s_1$ |
| $\varepsilon^2$ | Addition of "Connected to" edge: machine $m_2$ and sensor $s_2$ |
| $\varepsilon^3$ | Addition of "Is in" edge: product $p_1$ and machine $m_1$ |
| $\varepsilon^4$ | Deletion of edge $p_1$ -> $m_1$ |
| $\varepsilon^5$ | Addition of "maintenance" edge: employee e and machine $m_1$ |
| $\varepsilon^6$ | Deletion of edge e -> $m_1$ |
| $\varepsilon^7$ | Addition of "Powered by" edge: machine $m_1$ and power source p |
| $\varepsilon^8$ | Addition of "Is in" edge: product $p_2$ and machine $m_2$ |
| $\varepsilon^9$ | Deletion of edge $p_2$ -> $m_2$ |
| $\varepsilon^{10}$ | Addition of "Is in" edge: product $p_1$ and machine $m_2$ |
| $\varepsilon^{11}$ | Addition of "Powered by" edge: machine $m_2$ and power source p |
| $\varepsilon^{12}$ | Deletion of edge $p_1$ -> $m_2$ |

It will be noted that $\varepsilon^i$ denotes an update of the graph at a time $t^i$ (addition/deletion of edge/node).

Figure 5:
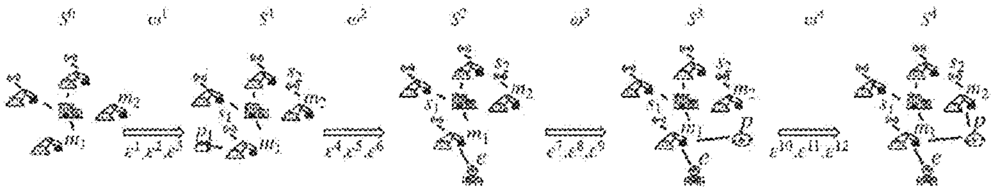
FIG. 5 shows an example of storage of the database of FIG. 4 according to the prior Copy+Log technique.
Figure 6:
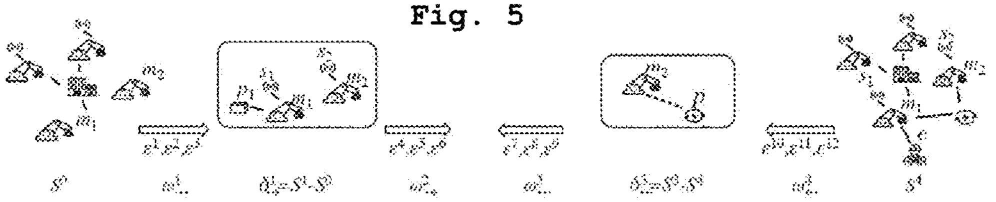
FIG. 6 shows an example of storage of the database of FIG. 4 according to the Delta-Copy+Log storage technique of an embodiment of the development.

To understand the advantages of the technique according to the development, a comparison is shown of the prior Copy+Log storage technique in FIG. 5, and of the claimed delta-Copy+Log storage technique in FIG. 6.

In FIG. 5, five successive snapshots of the graph, referenced $S^0$ to $S^4$, are illustrated. These five successive snapshots of the graph are stored in memory in the storage system implementing the prior Copy+Log method. The reference $\omega^i$ denotes the time window separating the snapshots $S^{i-1}$ and $S^i$. In the example of FIG. 5, each time window od is associated with a number N=3 of updates of the graph.

Thus, it is started from an initial snapshot $S^0$ of the graph. A new snapshot $S^1$ of the graph is stored in memory in the prior Copy+Log storage system, when the first three updates $\varepsilon^1$ to $\varepsilon^3$ listed in Table 1 were performed. Thus, the snapshot $S^1$ corresponds to the snapshot $S^0$, after addition of an edge symbolizing the connection of the machine $m_1$ and the sensor $s_1$, addition of an edge symbolizing the connection of the machine $m_2$ and the sensor $s_2$ and addition of an edge symbolizing the presence of the product $p_1$ in the machine $m_1$.

Similarly, the snapshot $S^2$ corresponds to the snapshot of the graph after the updates $\varepsilon^4$ to $\varepsilon^6$ of the graph have been performed within the time window $\omega^2$; the snapshot $S^3$ corresponds to the snapshot of the graph after the updates $\varepsilon^7$ to $\varepsilon^9$ of the graph have been performed within the time window $\omega^3$; the snapshot $S^4$ corresponds to the snapshot of the graph after the updates $\varepsilon^{10}$ to $\varepsilon^{12}$ of the graph have been performed within the time window $\omega^4$.

In FIG. 6 on the other hand, only two complete snapshots of the graph, $S^0$ and $S^4$, are illustrated, and therefore stored in memory in the Delta-Copy+Log storage system according to an embodiment of the development. Thus, a first reference container contains the snapshot $S^0$ which gives a description of the initial status of the graph; a second reference container contains the snapshot $S^4$ which gives a description of the final status of the graph. Between these two reference containers, only the delta containers are stored in memory, which do not contain a complete snapshot of the graph, but only a difference image, corresponding to the minimum number of updates to be performed between the successive snapshots of the graph at the start and at the end of the time window with which it is associated.

Thus, a first delta container, annotated $$\delta^1_{\rightarrow}$$

stores in memory the difference, or delta, between the initial snapshot $S^0$ and the snapshot of the graph $S^1$ at the end of the time window $$\omega^1_{\rightarrow}.$$

This gives:

$$\delta^1_{\rightarrow} = S^1 - S^0.$$

The snapshot of the graph $S^1$ itself is no longer saved in the storage system, unlike in the example of FIG. 5. This first delta container, referenced $$\delta^1_{\rightarrow},$$

is therefore constructed according to a forward approach, as illustrated by the arrow oriented from left to right.

Another delta container, annotated $$\delta^3_{\leftarrow}$$

stores in memory the difference, or delta, between the snapshot of the graph $S^3$ at the end of the inverse time window $$\omega^4_{\leftarrow}$$

and the final snapshot $S^4$: this gives $$\delta^3_{\leftarrow} = S^3 - S^4.$$

The snapshot of the graph $S^3$ itself is no longer saved in the storage system, unlike in the example of FIG. 5. This other delta container, referenced $$\delta^3_{\leftarrow},$$

is therefore constructed according to a backward approach, as illustrated by the arrow oriented from right to left.

Between these two difference images $$\delta^1_{\rightarrow}$$

and $$\delta^3_{\leftarrow},$$

two other containers corresponding to the time windows $$\omega^2_{\rightarrow}$$

and $$\omega^3_{\leftarrow}$$

store the updates of the graph which took place over these time intervals, namely the updates $\varepsilon^4$ to $\varepsilon^6$ for the direct time window $$\omega^2_{\rightarrow}$$

and the updates $\varepsilon^7$ to $\varepsilon^9$ for the inverse time window $$\omega^3_{\leftarrow}.$$

However, according to an embodiment, the storage system does not store in memory the difference image $\delta^2$, which corresponds:

According to a forward approach, to the difference image between the snapshot of the graph $S^2$ at the end of the direct time window $$\omega^2_{\rightarrow}$$

and the snapshot of the graph $S^1$ at the start of this time window:

$$\delta^2_{\rightarrow} = S^2 - S^1;$$

According to a backward approach, to the difference image between the snapshot of the graph $S^2$ at the end of the inverse time window $$\omega^3_{\leftarrow}$$

and the snapshot of the graph $S^3$ at the start of the same time window:

$$\delta^2_{\leftarrow} = S^2 - S^3.$$

Indeed, it is noted that the delta images which are time-centered between two snapshots are not relevant for the reconstruction of the result of a graph query.

In practice, the graph of FIG. 6 is constructed as follows. The updates $\varepsilon^i$ of the graph recently performed are targeted toward an open time window. If the size of this current open time window reaches the threshold N of the maximum number of updates in a window, it is then considered as a closed time window and a "forward" delta image is created.

The same method applies to retroactive time windows and deltas, in "backward" mode.

However, the creation of a delta image on closing an inverse time window is delayed until the closure of the next time window. For example, the creation of the difference image $$\delta^3_{\leftarrow},$$

in inverse chronological order, is delayed until the inverse time window $$\omega^4_{\leftarrow}$$

is closed (i.e. until the number of updates on this time window has reached the threshold N=3, i.e. after carrying out the operations $\varepsilon^1$ to $\varepsilon^{12}$).

Finally, if the number of time windows and associated containers created reaches a multiple of M, a snapshot of the graph is saved in the storage system. In the example of FIG. 6, M=4. After creating and storing the adjacent time windows $$\omega^1_{\rightarrow}, \omega^2_{\rightarrow}, \omega^3_{\leftarrow} \text{ and } \omega^4_{\leftarrow},$$

the system therefore stores the snapshot $S^4$ of the graph.

It will be noted that the parameters N and M, which correspond respectively to the maximum number of updates of the graph within a time window, and to the number of time windows between two successive stored snapshots, are flexible parameters which can be adapted according to the needs of the system, for example backend resources managing the storage system. In one example, $N=10^6$.

Figure 7:
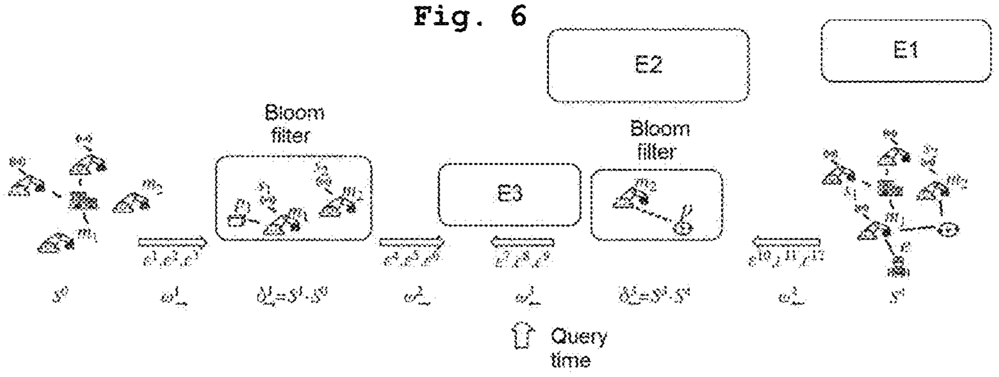
FIG. 7 illustrates an example of querying of the storage system of FIG. 6.

With reference to FIG. 7, an example of a query of the graph-oriented time database of FIG. 6 will now be described.

The following query is considered: in which machine was the product $p_2$ located at the time $t^8$?

As stated above, the technique according to an embodiment of the development is advantageous in execution and computing time, insofar as half of the data is stored in "forward" mode, and the other half in "backward" mode. Thus, the result of a query is computed in forward or backward mode, depending on whether the requested time is nearer that of a previous or subsequent snapshot, respectively. In any case, only half of the time windows and the deltas, at most, need to be verified in order to respond to a single query.

In this instance, the query relating to the position of the product $p_2$ at the time $t^8$, it is determined that the response will be found in the second half of the graph, and therefore in "backward" mode.

During a first step E1, the final snapshot $S^4$ is therefore consulted.

During a second step E2, the Bloom filter associated with the difference image $$\overleftarrow{\delta}^3$$

is queried. It is noted that a Bloom filter is a probabilistic data structure invented in 1970. When testing the presence of an element in a set, a Bloom filter makes it possible to ascertain:

- with certainty, the absence of an element (there can be no false negatives);
- with a certain probability, the presence of an element (there may be false positives).

The size of a Bloom filter is fixed and independent of the number of elements contained, which makes it a very compact structure. There are however as many false positives as there are elements in the structure. The principle of the filter is based on the use of hashing functions.

During this step E2, as no update associated with the product $p_2$ is detected in the Bloom filter associated with $$\overleftarrow{\delta}^3,$$

verifying the difference image $$\overleftarrow{\delta}^3$$

can be avoided without risk, and the number of reads on the hard drive containing the storage system thus reduced.

During a third step E3, the container associated with the inverse time window $$\overleftarrow{\omega}^3$$

is therefore consulted, to obtain the data item according to which, at the time $t^8$, the product $p_2$ was located in the machine $m_2$.

Bloom filters are advantageous in that they have a limited size, unlike the other indexing techniques which increase with the number of data items indexed. Bloom filters represent a good solution for verifying the existence of a key in a set of candidate keys, on the condition that the size of the set is known. According to the claimed storage technique, a Bloom filter contains at most N updates each corresponding to a separate node: therefore, in principle, the maximum number of data elements to be inserted into the Bloom filter is known. In order to limit the use of the memory storage space by the Bloom filters, the latter are stored in the main memory and the memory use threshold is set as the design parameter to limit the creation of Bloom filters. In other words, when the space occupied by the Bloom filters reaches the specified threshold, a FIFO (First In First Out) policy is implemented to expel the oldest Bloom filters (corresponding to the oldest delta) from the cache.

Figure 8:
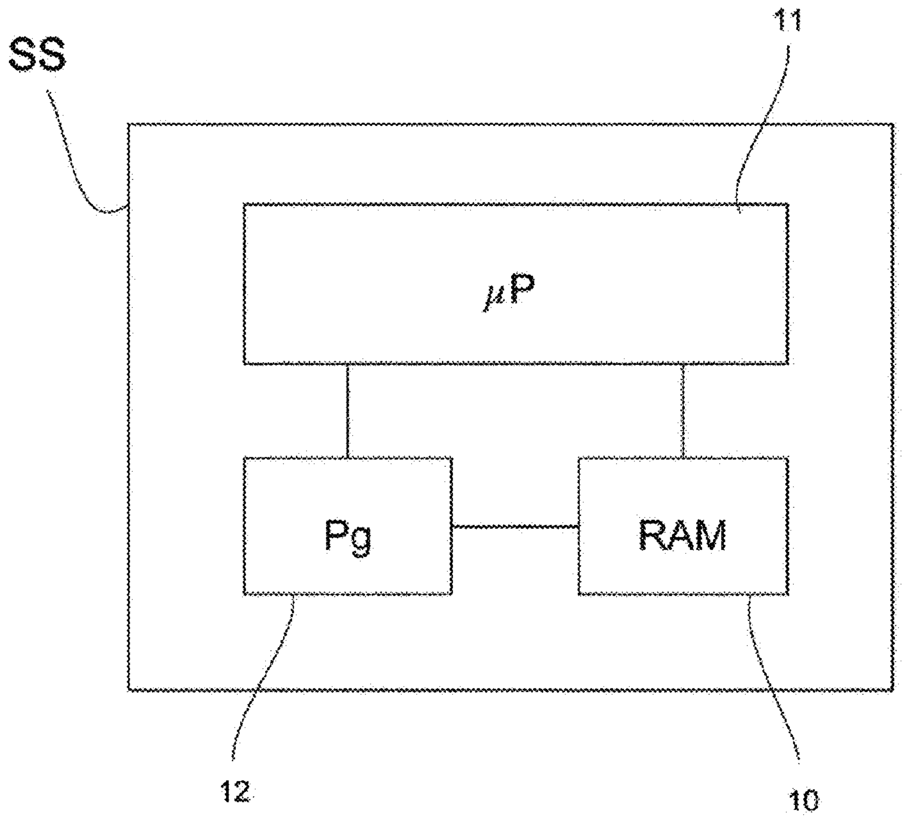

With reference to FIG. 8, the hardware structure of a storage system according to an embodiment of the development will now be described.

Such a storage system SS comprises a random access memory 10 (for example a RAM memory), a processing unit 11 equipped for example with a processor, and controlled by a computer program, stored in a read only memory 12 (for example a ROM memory or a hard drive). At initialization, the code instructions of the computer program are for example loaded in the random access memory 10 before being executed by the processor of the processing unit 11. The random access memory 10 contains in particular the physical containers associated with the successive adjacent time windows, the reference snapshots, the delta images, and the associated Bloom filters. The processor of the processing unit 11 controls the storage of the updates of the graph, the opening and closure of the time windows, the creation of delta images and the storage of the reference snapshots of the graph.

The term unit may correspond both to a software component and to a hardware component or a set of hardware and software components, a software component corresponding itself to one or more computer programs or subprograms or more generally to any element of a program capable of implementing a function or a set of functions.

FIG. 8 illustrates only a particular way, among several possible, of embodying the storage system, so that it performs the steps of the method detailed above, with reference to FIGS. 3 to 7 (in any of the different embodiments, or in a combination of these embodiments). Indeed, these steps may be carried out either on a reprogrammable computing machine (a PC computer, a DSP processor or a microcontroller) executing a program comprising a sequence of instructions, or on a dedicated computing machine (for example a set of logic gates such as an FPGA or an ASIC, or any other hardware module).

In the case where the storage system is embodied with a reprogrammable computing machine, the corresponding program (i.e. the instruction sequence) may be stored in a removable storage medium (such as for example a floppy disk, a CD-ROM or a DVD-ROM) or not, this storage medium being partially or totally readable by a computer or a processor.

The invention claimed is:

1. A system for storing a graph-oriented time database, comprising a set of containers associated with adjacent time windows, a container containing a sequence of successive modifications between two snapshots of the graph respectively associated to a beginning and an end of the time window associated to the container, wherein at least some of the containers, called reference containers, also contain a snapshot of the graph, called a reference snapshot, the reference snapshot being one of the two snapshots of the graph respectively associated to a beginning and an end of the time window associated to the reference container, and in that at least some other containers, called delta containers, contain a difference image between two snapshots of the graph, respectively associated with the start and with the end of the time window associated with the delta container.

2. The system for storing a graph-oriented time database according to claim 1, wherein the difference image is stored in the form of a minimal number of modifications of the graph between the two snapshots.

3. The system for storing a graph-oriented time database according to claim 1, wherein the time windows may be of distinct durations but contain a same number N of successive updates of the graph.

4. The system for storing a graph-oriented time database according to claim 1, wherein the system comprises a fixed number M of time windows between two successive reference snapshots.

5. The system for storing a graph-oriented time database according to claim 4, wherein, between two successive reference snapshots, the difference images of the first M/2 time windows contain modifications of the graph to be made to a snapshot of the graph associated with the start of the time window to transform it into a snapshot of the graph associated with the end of the time window, and the difference images of the last M/2 time windows contain modifications of the graph to be made to a snapshot of the graph associated with the end of the time window to transform it into a snapshot of the graph associated with the start of the time window.

6. The system according to claim 1, wherein a Bloom filter is associated with at least some of the delta containers.

7. A method for storing a graph-oriented time database, in the form of a set of containers associated with adjacent time windows, a container containing a sequence of successive modifications between two snapshots of the graph respectively associated to a beginning and an end of the time window associated to the container, wherein the method implements storage, in at least some of the containers, called reference containers, of a snapshot of the graph, called a reference snapshot, the reference snapshot being one of the two snapshots of the graph respectively associated to a beginning and an end of the time window associated to, called reference snapshot, and in that the method implements storage, in at least some other containers, called delta containers, of a difference image between two snapshots of the graph, respectively associated with the start and with the end of the time window associated with the delta container.

8. The method for storing a graph-oriented time database according to claim 7, wherein the method comprises storage acts in a forward mode comprising:

(i) storing a reference snapshot of the graph;

(ii) storing updates of the graph within a current time window up to a maximum number N of updates;

(iii) closing the current time window and creating a difference image between two snapshots of the graph associated respectively with the start and with the end of the closed time window; and (iv) opening a new current time window and repeating acts (ii) and (iii), up to the storage of M/2 time windows, where M denotes a maximum number of time windows between two successive reference snapshots.

9. The method for storing a graph-oriented time database according to claim 7, wherein the method comprises storage acts in a backward mode comprising:

(i) storing updates of the graph within a first time window up to a maximum number N of updates;

(ii) closing the first time window and opening a second time window;

(iii) storing updates of the graph within the second time window up to the maximum number N of updates;

(iv) creating a difference image between two snapshots of the graph associated respectively with the start and with the end of the closed first time window;

(v) repeating acts (ii) to (iv), up to the storage of M/2 time windows, where M denotes a maximum number of time windows between two successive reference snapshots; and (vi) storing a reference snapshot of the graph.

10. A processing circuit comprising a processor and a memory, the memory storing program code instructions of a computer program to execute the method according to claim 7, when the computer program is executed by the processor.

11. A non-transitory computer-readable recording medium on which a computer program comprising program code instructions for the execution of the storage method according to claim 7 is saved.

12. A system for storing a graph-oriented time database, comprising a set of containers associated with adjacent time windows, a container containing a sequence of successive modifications of the graph over a time window with which it is associated, wherein at least some of the containers, called reference containers, also contain a snapshot of the graph within the time window associated with the reference container, called a reference snapshot, and in that at least some other containers, called delta containers, contain a difference image between two snapshots of the graph, respectively associated with the start and with the end of the time window associated with the delta container, wherein the system comprises a fixed number M of time windows between two successive reference snapshots, wherein, between two successive reference snapshots, the difference images of the first M/2 time windows contain modifications of the graph to be made to a snapshot of the graph associated with the start of the time window to transform it into a snapshot of the graph associated with the end of the time window, and the difference images of the last M/2 time windows contain modifications of the graph to be made to a snapshot of the graph associated with the end of the time window to transform it into a snapshot of the graph associated with the start of the time window, and wherein the system does not comprise a delta container containing a centered difference image between two reference snapshots.

* * * * *